US009232233B2

United States Patent
Zhou et al.

(10) Patent No.: US 9,232,233 B2
(45) Date of Patent: Jan. 5, 2016

(54) ADAPTIVE CONFIGURATION OF REFERENCE FRAME BUFFER BASED ON CAMERA AND BACKGROUND MOTION

(75) Inventors: Xiaosong Zhou, Campbell, CA (US);
Hsi-Jung Wu, San Jose, CA (US);
Yao-Chung Lin, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 429 days.

(21) Appl. No.: 13/175,143

(22) Filed: Jul. 1, 2011

(65) Prior Publication Data
US 2013/0003845 A1 Jan. 3, 2013

(51) Int. Cl.
*H04N 7/32* (2006.01)
*H04N 19/58* (2014.01)
(Continued)

(52) U.S. Cl.
CPC ............. *H04N 19/58* (2014.11); *H04N 19/105* (2014.11); *H04N 19/109* (2014.11); *H04N 19/139* (2014.11); *H04N 19/172* (2014.11); *H04N 19/197* (2014.11); *H04N 19/46* (2014.11); *H04N 19/61* (2014.11)

(58) Field of Classification Search
CPC ............ H04N 19/00024; H04N 19/58; H04N 19/105; H04N 19/109; H04N 19/139; H04N 19/172; H04N 19/197; H04N 19/46; H04N 19/61
USPC .............. 375/240.14, 240.02, 240.24, 240.16
See application file for complete search history.

(56) References Cited

U.S. PATENT DOCUMENTS 5,796,435 A * 8/1998 Nonomura et al. ...... 375/240.03
5,926,225 A * 7/1999 Fukuhara et al. .......... 348/416.1
(Continued)

FOREIGN PATENT DOCUMENTS

GB 2403618 A 5/2005
JP 4593556 B2 12/2010
(Continued)

OTHER PUBLICATIONS

Kutka, "Content-Adaptive Long-Term Prediction With Reduced Memory" IEEE ICIP 2003, vol. 3, pp. 817-820, Sep. 14, 2003.*
(Continued)

*Primary Examiner* — Jay Patel
*Assistant Examiner* — Joseph Suh
(74) *Attorney, Agent, or Firm* — Kenyon & Kenyon LLP (57) ABSTRACT

In a video coding/decoding system, reference picture caches in a video coder and decoder may be partitioned dynamically based on camera and background motion can lead to improved coding efficiency and coding quality. When a camera is fixed and therefore exhibits low motion, a system may allocate larger portions of the reference picture cache to storage of long term reference frames. In this case, foreground elements of an image (for example, a person) may move in front of a relatively fixed background. Increasing the number of long term reference frames can increase the chances that, no matter where the foreground elements are within a frame currently being coded, the reference picture cache will contain at least one frame that provides an adequate prediction match to background elements within the new frame. Thus the background elements uncovered in the current frame can be coded at high quality with a low number of bits. When a camera exhibits high motion, the system may allocate larger portions of the reference picture cache to storage of short term reference frames.

22 Claims, 5 Drawing Sheets

(51) Int. Cl.
*H04N 19/196* (2014.01)
*H04N 19/105* (2014.01)
*H04N 19/139* (2014.01)
*H04N 19/172* (2014.01)
*H04N 19/46* (2014.01)
*H04N 19/61* (2014.01)
*H04N 19/109* (2014.01)

(56) References Cited

U.S. PATENT DOCUMENTS

| | | | |
|---|---|---|---|
| 6,389,072 B1* | 5/2002 | Tzou et al. | 375/240 |
| 6,831,652 B1* | 12/2004 | Orr | 345/543 |
| 7,852,916 B2* | 12/2010 | Duvivier | 375/240 |
| 2002/0092030 A1* | 7/2002 | Gu | 725/134 |
| 2002/0126752 A1* | 9/2002 | Kim | 375/240.03 |
| 2003/0112347 A1* | 6/2003 | Wyman | 348/231.99 |
| 2004/0136461 A1* | 7/2004 | Kondo et al. | 375/240.16 |
| 2004/0247031 A1* | 12/2004 | Hagai et al. | 375/240.16 |
| 2004/0255063 A1* | 12/2004 | Crinon et al. | 710/55 |
| 2005/0013369 A1* | 1/2005 | Lee | 375/240.16 |
| 2005/0147167 A1 | 7/2005 | Dumitras et al. | |
| 2006/0088094 A1* | 4/2006 | Cieplinski et al. | 375/240.01 |
| 2006/0098738 A1* | 5/2006 | Cosman et al. | 375/240.16 |
| 2006/0193379 A1* | 8/2006 | Ridge et al. | 375/240.01 |
| 2007/0008323 A1 | 1/2007 | Zhou | |
| 2007/0104272 A1* | 5/2007 | He et al. | 375/240.12 |
| 2008/0069223 A1 | 3/2008 | Jeon | |
| 2008/0084930 A1* | 4/2008 | Sekiguchi et al. | 375/240.16 |
| 2008/0247463 A1* | 10/2008 | Buttimer et al. | 375/240.12 |
| 2008/0279280 A1 | 11/2008 | Iguchi et al. | |
| 2008/0319745 A1* | 12/2008 | Caldwell et al. | 704/235 |
| 2009/0052450 A1* | 2/2009 | Mockett | 370/390 |
| 2009/0086814 A1* | 4/2009 | Leontaris et al. | 375/240.02 |
| 2009/0195505 A1* | 8/2009 | Chen et al. | 345/166 |
| 2009/0208062 A1* | 8/2009 | Sorek et al. | 382/107 |
| 2010/0177963 A1* | 7/2010 | Yokomitsu et al. | 382/170 |
| 2010/0226444 A1* | 9/2010 | Thevathasan et al. | 375/240.29 |
| 2010/0246668 A1* | 9/2010 | Rintaluoma | 375/240.02 |
| 2010/0315560 A1* | 12/2010 | Hahn et al. | 348/699 |
| 2010/0329349 A1* | 12/2010 | Duvivier | 375/240.16 |
| 2011/0032995 A1* | 2/2011 | Chua et al. | 375/240.24 |
| 2011/0194734 A1* | 8/2011 | Gensolen et al. | 382/107 |
| 2012/0084443 A1* | 4/2012 | Theimer et al. | 709/226 |
| 2012/0275511 A1* | 11/2012 | Shemer et al. | 375/240.02 |
| 2013/0142262 A1* | 6/2013 | Ye et al. | 375/240.16 |
| 2013/0166772 A1* | 6/2013 | Tapio Kekki | 709/234 |

FOREIGN PATENT DOCUMENTS

| | | |
|---|---|---|
| KR | 10-2008-0017071 A | 2/2008 |
| KR | 10-2008-0068716 A | 7/2008 |
| WO | 2007/047758 A1 | 4/2007 |

OTHER PUBLICATIONS

International Search Report and Written Opinion of the International Search Authority in counterpart International Application No. PCT/US2012/044994, report dated Oct. 18, 2012.

Robert Kutka, "Content-Adaptive Long-Term Prediction With Reduced Memory"; Corporate Technology, Information and Communications, Siemens AG, Otto-Hahn-Ring 6, 81739 Munich; IEEE, US, vol. 3, Sep. 14, 2003, pp. 817-820, XP010669959, ISBN: 978-0-7803-6298-7.

Dietmar Hepper, "Efficiency Analysis and Application of Uncovered Background Prediction in a Low Bit Rate Image Coder", IEEE Transactions on Communications, vol. 38, No. 9, Sep. 1, 1990; ISSN: 0090-6778, DOI: 10.1109/16.61399, pp. 1578-1584.

SM Shen et al., "Restricted Multiple Reference Frames With Long Term Frame Buffer", ITU Telecommunications Standardization Sector, Study Group 16, Question 6, Video Coding Experts Group (VCEG), Nov. 26, 2001, 10 total pages.

Korean Office Action, issued May 20, 2015, from corresponding Korean Patent Application No. 10-2013-7034955, filed Dec. 20, 2013.

* cited by examiner

ADAPTIVE CONFIGURATION OF REFERENCE FRAME BUFFER BASED ON CAMERA AND BACKGROUND MOTION

BACKGROUND

In video coder/decoder systems, a video coder may code a source video sequence into a coded representation that has a smaller bit rate than does the source video and, thereby may achieve data compression. The coder may code processed video data according to any of a variety of different coding techniques to achieve compression. One common technique for data compression uses predictive coding techniques (e.g., temporal/motion predictive coding). For example, some frames in a video stream may be coded independently (I-frames) and some other frames (e.g., P-frames or B-frames) may be coded using other frames as reference frames. P-frames may be coded with reference to a single previously coded frame (P-frame) and B-frames may be coded with reference to a pair of previously-coded frames, typically a frame that occurs prior to the B-frame in display order and another frame that occurs subsequently to the B-frame in display order. The previously-coded frames that support the P- and B-coding modes are called "reference frames." The resulting compressed sequence (bit stream) may be transmitted to a decoder via a channel. To recover the video data, the bit stream may be decompressed at the decoder, by inverting the coding processes performed by the coder, yielding a received decoded video sequence.

The coder and decoder both decode coded reference frames and cache them locally. Absent transmission errors, the reference picture caches at both the coder and decoder should be synchronized. The reference picture caches have limited depth and, when the caches are filled to capacity, a new reference picture evicts an older reference picture according to a predetermined eviction scheme.

Better compression efficiency and coding quality can be achieved if reference frames can be selected that provide good matches to later-received frames from a video sequence. Conventional management processes do not always cause reference frames to be retained in caches that provide good prediction references for other frames. For example, in many coding environments, a video coder always keeps a predetermined number of most-recently coded reference frames. In video sequences with extremely low levels of motion, however, improved coding efficiency may be achieved by retaining reference frames older than the Nth most recently coded reference frames. In video sequences having high levels of motion, improved coding efficiency may be achieved by retaining younger reference frames within a reference picture cache, those temporally closest to new frames being coded. No known coding system adequately balances these competing interests.

DETAILED DESCRIPTION

Embodiments of the present invention provide a video coding system that performs predictive video coding with reference to cached reference pictures. A reference picture cache may be partitioned into a pair of buffer areas for storage of long term reference frames and short term reference frames respectively. Relative sizes of the buffer areas vary dynamically based on an amount of motion present in the video data. During coding, motion may be estimated for individual frames of an input sequence and searches for prediction references may be confined to one of the buffer areas based on the frame's motion.

Dynamic partitioning of a reference picture cache based on camera and background motion can lead to improved coding efficiency and coding quality. When a camera is fixed and therefore exhibits low motion, a system may allocate larger portions of the reference picture cache to storage of long term reference frames. In this case, foreground elements of an image (for example, a person) may move in front of a relatively fixed background. Increasing the number of long term reference frames can increase the chances that, no matter where the foreground elements are within a frame currently being coded, the reference picture cache will contain at least one frame that provides an adequate prediction match to background elements within the new frame. Thus the background elements uncovered in the current frame can be coded at high quality with a low number of bits.

When there is high camera motion or lots of movement in the background, a system may allocate larger portions of the reference picture cache to storage of short term reference frames. Motion blur and rolling shutter effects are common during camera motion and short term prediction references usually provide better coding for such effects because recently-coded reference frames are likely to have similar effects.

FIG. 1(a) illustrates a simplified block diagram of a video coding system 100 according to an embodiment of the present invention. The system 100 may include a plurality of terminals 110, 120 interconnected via a network 130. The terminals 110, 120 each may capture video data at a local location and code the video data for transmission to the other terminal via the network 130. Each terminal 110, 120 may receive the coded video data of the other terminal from the network 130, decode the coded data and display video data recovered therefrom. As illustrated in FIG. 1(a), the terminals 110, 120 are illustrated as smart phones but the principles of the present invention are not so limited. Embodiments of the present invention find application with personal computers (both desktop and laptop computers), tablet computers, computer servers, media players and/or dedicated video conferencing equipment. The network 130 represents any number of networks that convey coded video data between the terminals 110, 120, including for example wireline and/or wireless communication networks. The communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present invention unless explained hereinbelow.

Figure 1:
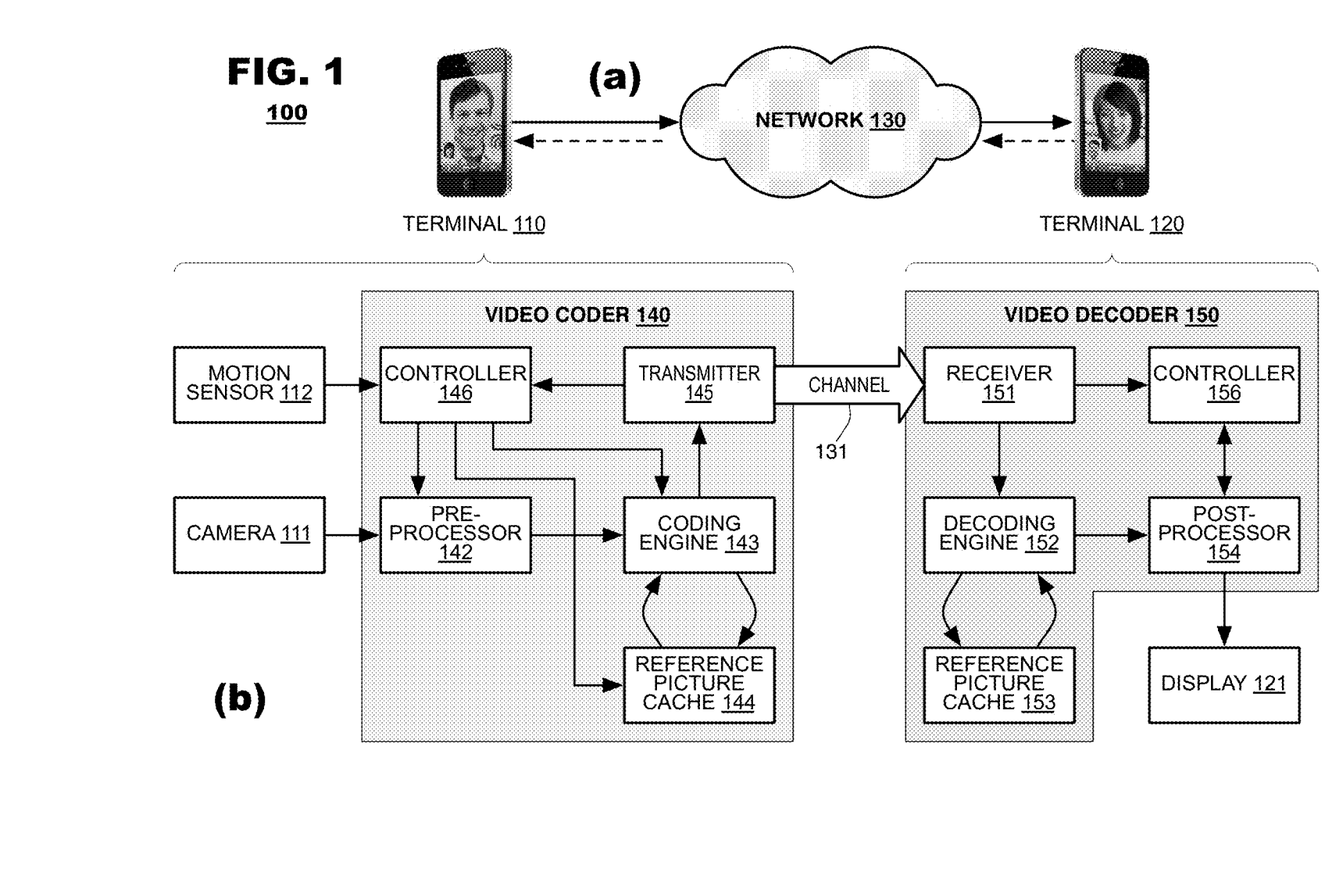
FIG. 1 illustrates a simplified block diagram of a video coding system according to an embodiment of the present invention.

FIG. 1(b) further illustrates a functional block diagram of a video coder and decoder 140, 150 operable within the system 100. Specifically, FIG. 1 illustrates a camera 110, motion sensor 112 and a video coder 140 for terminal 110. The video coder 140 may code video data captured at the camera 111 and may deliver the coded data to a channel 131 provided by the network 130. The video coder 140 may select coding parameters based not only on the content of the video data itself but also by motion data provided by a motion sensor provided within the terminal 110. The motion sensor 112 may be implemented in any number of ways, including a gyroscope and/or accelerometer, for example.

FIG. 1 illustrates a video decoder 150 and display 121 for terminal 120. The video decoder 150 may receive the coded video data from the channel 131, decode the coded video data and render the recovered video data at a display 121 of the second terminal 120.

The functional blocks illustrated in FIG. 1 support video coding and decoding in one direction only. For bidirectional communication, terminal 120 may include functional blocks (not shown) for video coding of locally-captured video and terminal 110 may include functional blocks (also not shown) for decoding of coded video data received from the terminal 120 via the network 130. Although it is envisioned that the principles of the present invention may be applied at coders resident at either terminal 110, 120, the functional blocks provided for the terminal 120 to terminal 110 coding direction are omitted from FIG. 1 merely to simplify the present discussion.

As illustrated, the video coder 140 may include a pre-processor 142, a coding engine 143, a reference picture cache 144, a transmitter 145 and a controller 146. The pre-processor 142 may accept source video from the camera 111 and may perform various processing operations on the source video to condition it for coding. The coding engine 143 may perform compression operations on the pre-processed source video to reduce spatial and/or temporal redundancies therein. The coding engine 143 may output coded video data to the transmitter 145, which may format the data for transmission over the channel 131 and delivery to the terminal 120. As part of its operation, the coding engine 143 may code new frames of video data according to motion prediction techniques using data stored in the reference picture cache 144 as a prediction reference. The coding engine 143 further may decode coded video data of the reference frames for storage in the reference picture cache 144.

The video coder 140 may include a controller 146 to manage operation of the video coder 140. In one embodiment, the controller 146 may partition the reference picture cache 144 into long term buffer areas and short term buffer areas (not shown in FIG. 1) as discussed below. The controller 146 further may control prediction searches performed by the coding engine 143 throughout the buffer areas of the reference picture cache and may select other coding parameters on which the coding engine 143 will operate. In this regard, the controller 146 may perform these control operations after analyzing motion data presented to it from the motion sensor 112.

The pre-processor 142 may perform a variety of other video processing operations on the source video output from the camera to condition the source video for coding. The pre-processor 142 may include an array of filters (not shown) such as de-noising filters, sharpening filters, smoothing filters, bilateral filters and the like that may be applied dynamically to the source video based on characteristics observed within the video. The pre-processor 142 may include its own controller (not shown) to review the source video data from the camera and select one or more of the filters for application. Typically, the pre-processor 142 conditions the source video data to render compression more efficient or to preserve image quality in light of data losses that may be incurred as the coding engine 143 operates.

The coding engine 143 may code input video data according to a variety of different coding techniques to achieve compression. The coding engine 143 may compress the images by a motion-compensated prediction. Frames of the input video may be assigned a coding type, such as intra-coding (I-coding), uni-directionally predictive coding (P-coding) or bi-directionally predictive coding (B-coding). The frames further may be parsed into a plurality of pixel blocks and may be coded by transform coding, quantization and entropy coding. Pixel blocks of P- and B-coded frames may be coded predictively, in which case, the coding engine may calculate motion vectors identifying pixel blocks of decoded frames stored in the reference picture cache 144 that serve as predictions of the pixel blocks being coded and may generate prediction residuals prior to engaging the transform coding. In an embodiment, the video coder may operate according to coding protocols defined by ITU H.263, H.264 and the like.

The coding engine 143 further may designate that certain coded frames may be used as reference frames for use in coding later-received input frames. The coding engine 143 may decode the coded video data of the reference frame and store the decoded reference frame in the reference picture cache 144 so that the video coder 140 has a decoded copy of the reference frame as it will be decoded at the video decoder 150.

The transmitter 145 may transmit the coded video data to the channel 131. In so doing, the transmitter 145 may multiplex the coded video data with other data to be transmitted such as coded audio data and control data (provided by processing sources that are not illustrated in FIG. 1). The transmitter 145 may format the multiplexed data into a format appropriate for the network 130 and transmit the data to the network.

As part of its operation, the transmitter 145 may observe performance of the network and develop statistics on such performance. For example, the transmitter 145 may estimate the bandwidth of a channel 131 that the network 130 can provide to the terminal 110. In many networking applications, network channels provide variable data rates for transmission, which change without notice to the transmitting terminals. The transmitter 145 may receive indicators from the channel 131 or from the far-end terminal 120 identifying transmission failures, transmission latencies and other indicators of network performance from which the transmitter 145 may estimate network performance. The transmitter 145 may provide channel statistics to the controller 146. The controller 146, in turn, may alter its selection of coding parameters to match the bit rate of coded data output by the coding engine 143 to the estimated bandwidth of the channel 131.

The video decoder 150 may include a receiver 151, a decoding engine 152, a reference picture cache 153, a post-processor 154 and a controller 156. The decoding engine 152 may decode coded video data received via the channel 131 with reference to reference pictures stored in the reference picture cache 153. The decoding engine 152 may output decoded video data to the post-processor 154, which may perform additional operations on the decoded video data to condition it for display. Decoded video data of reference frames also may be stored to the reference picture cache 153 for use during decoding of subsequently received coded video data.

The decoding engine 152 may perform decoding operations that invert coding operations performed by the coding engine 143. The decoding engine 152 may perform entropy decoding, dequantization and transform decoding to generate recovered pixel block data. Quantization/dequantization operations are lossy processes and, therefore, the recovered pixel block data likely will be a replica of the source pixel blocks that were coded by the video coder 140 but will include some error. For pixel blocks coded predictively, the transform decoding may generate residual data; the decoding engine 152 may use motion vectors associated with the pixel blocks (which may be implied in some cases) to retrieve predicted pixel blocks from the reference picture cache 153 to be combined with the prediction residuals. Decoded pixel blocks may be reassembled into frames and output to the post-processor 154.

When the decoding engine 152 decodes new reference frames, it may store the decoded reference frames in the reference picture cache 153 for use in decoding subsequently-received coded video data.

The post-processor 154 may perform additional video processing to condition the recovered video data for rendering, commonly at a display device. Typical post-processing operations may include applying deblocking filters, edge detection filters, ringing filters and the like. The post-processor 154 may output recovered video sequence from rendering on the display 121 or, optionally, stored to memory for later retrieval and display.

The video coder 140 and video decoder 150 may operate according to a coding protocol that distinguishes between two types of reference frames. A first type of reference frame, called "long term" reference frames herein, are identified as such in the governing coding protocol and assigned an index number. According to the coding protocol, the video decoder 150 must store a long term reference frame in its cache and prevent it from being evicted until commanded by the video coder 140. During run time, if a new long term reference frame is generated with an index that matches a previously generated long term reference frame, the previously-generated long term reference frame may be evicted from the reference picture caches 144, 153 of the video coder and decoder 140, 150. Moreover, the protocol supports commands to allow a video coder 140 to instruct the decoder 150 to delete a long term reference frame from its reference picture cache 153 without providing a replacement long term reference frame; in this case, the long term reference frame is identified by an index number.

Another type of reference frame, called "short term" reference frames herein, has no such protection against eviction. The short term reference frames may be stored in the reference picture cache in a first in, first out basis. The reference picture cache typically has a fixed capacity, say 16 frames. Thus, when the reference picture cache is filled completely with previously-stored reference frames and a new short term reference frame occurs, the decoder 150 and coder 140 evict an oldest short term reference frame to make room for the new reference frame. The evicted short term reference frame will be the oldest short term reference frame in the cache 153 but it need not be the oldest reference frame overall; older long term reference frames will be protected against eviction until identified for replacement or deletion by the video coder 140.

As discussed, the video coder's reference picture cache 144 stores decoded reference frames, both long term and short term, as generated by the decoder. Thus, in the absence of transmission errors between the video coder 140 and decoder 150, the video coder's reference picture cache 144 may mimic storage and eviction operations that occur in the decoder's reference picture cache 153.

Figure 2:
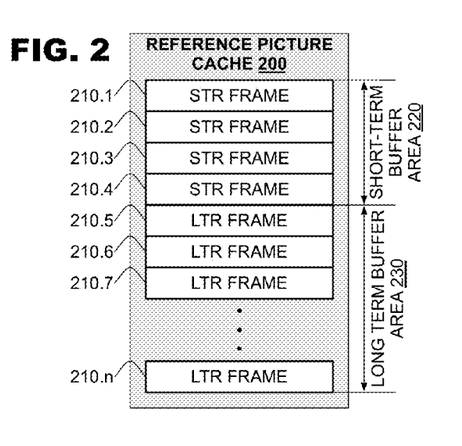
FIG. 2 figuratively illustrates a reference picture cache according to an embodiment of the present invention.

FIG. 2 figuratively illustrates a reference picture cache 200 according to an embodiment of the present invention. The reference picture cache 200 may include a plurality of entries 210.1-210.n, each of which may store data of a decoded reference frame. The capacity of the reference picture cache may be fixed. Oftentimes, the capacity of the reference picture cache may be limited by constraints imposed by the coding protocol under which the coder operates. For example, the H.264 coding protocol allows for up to 16 reference pictures to be active between an coder and a decoder at any given time. In this case, the capacity of the reference picture cache would be set to match the constraints of the coding protocol—16 frames.

According to an embodiment of the present invention, the reference picture cache may be partitioned dynamically to store short term reference frames and long term reference frames. Accordingly, FIG. 2 illustrates the reference picture cache 200 as partitioned into a short term buffer area 220 and a long term buffer area 230. As these names imply, the short term buffer area 220 represents a portion of the reference picture cache 200 that has been allocated solely for storage of short term reference frames. The long term buffer area 230 represents a portion of the reference picture cache 200 that has been allocated solely for storage of long term reference frames. The relative sizes of the short term buffer area 220 and the long term buffer area 230 may vary dynamically during operation.

FIG. 2 is merely a functional representation of the reference picture cache 200. In practice, video coders may be implemented in a variety of ways. A video coder 200 may be implemented entirely in software, in which case, the reference picture cache 200 and the buffer areas 220 and 230 may be implemented as an allocation of memory by an operating system from a larger memory system of a general purpose computer. In other implementations, the video coder may be implemented in hardware, in which case the reference picture cache may be implemented as a dedicated memory system within an integrated circuit. And, of course, hybrid implementations may be made in which case the reference picture cache 200 may be found either within general purpose memory or a dedicated memory system. The principles of the present invention find application in any of the foregoing embodiments.

Figure 3:
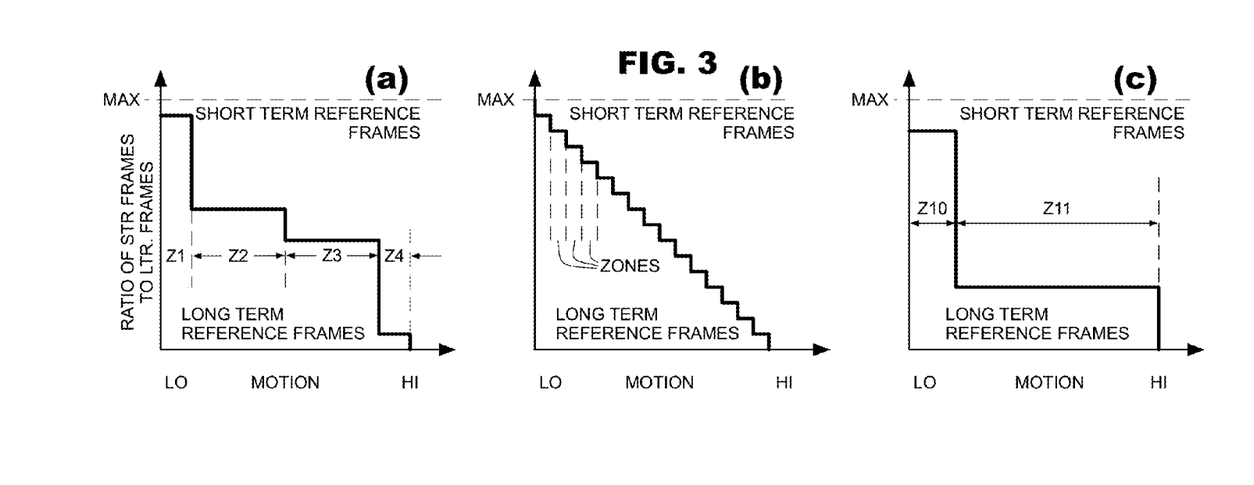
FIG. 3 illustrates different schemes for partitioning a reference picture cache according to various embodiments of the present invention.

FIG. 3 illustrates several different schemes for partitioning a reference picture cache based on observed motion. In each scheme, a controller (not shown) measures camera motion over a predetermined period of time and partitions the reference picture cache into a short term buffer area and a long term buffer area based on the observed motion. Generally, when low amounts of motion are detected, the controller increases the size of the long term buffer area as compared to the short term buffer area and, when high amounts of motion are detected, the controller increases the size of the short term buffer area as compared to the long term buffer area.

FIG. 3(a) illustrates an implementation in which there are four different partition levels based on estimated motion, which correspond to four different "zones" Z1-Z4 of observed motion. Zones Z1 and Z4 as illustrated correspond to very low levels of motion and very high levels of motion respectively. In the case of zone Z1, the reference picture cache may be partitioned such that almost all of the cache's capacity is assigned to storage of long term reference frames. In the case of zone Z4, the reference picture cache may be partitioned such that almost all of the cache's capacity is assigned for storage of short term reference frames. Zones Z2 and Z3 correspond to different levels of motion in intermediate ranges. In the illustrated embodiment, the reference picture cache may be partitioned with more balance between the short term buffer area and the long term buffer area. As illustrated, zone Z2 corresponds to lower levels of motion in the intermediate range and, therefore, has a slightly higher allocation to the long term buffer area. Conversely, zone Z3 corresponds to high levels of motion in the intermediate range and, therefore, has a slightly higher allocation to the short term buffer area.

FIG. 3(b) illustrates an implementation in which partitioning proceeds in a step-wise linear fashion. That is, for a reference picture cache having a capacity of n frames, there may be n partitioning levels each corresponding to a respective zone of observable motion. Although the step-wise curve illustrated in FIG. 3(b) is shown as generally linear, other permutations are permissible. For example, the step-wise function could follow a variety of different curves (not shown), logarithmic or otherwise, in which case, the detected zones of motion would be spaced equally from each other.

FIG. 3(c) illustrates yet another implementation in which the partition scheme operates according to only two zones Z10 and Z11. In this embodiment, zone Z10 corresponds to a zone of motion where a camera is fairly still as when it is placed on a table or other stationary support. As illustrated, in this case, the long term buffer area may be allocated to have a very large portion of the reference picture cache's capacity. Zone Z11 may correspond to a zone of motion where the camera is determined to be moving, for example, in the human hand, in a support in a car or train and the like. In this embodiment, the system does not differentiate between intermediate levels of motion and high levels of motion. The zones Z10 and Z11 do not cover ranges of motion having equal width in the embodiment of FIG. 3(c) whereas the bands of FIG. 3(b) have equal width.

The partitioning schemes may be selected based on motion sensor data that as provided to the video coder over a period of time longer than the frame rate of the coder. For example, in a video coding system operating at 30 frames per second, the video coder may gather motion statistics over 5 seconds. Moreover, this period of time may vary based on the frame rate of the video coder. If a frame rate drops to 10 frames per second, for example due to loss of bandwidth within the network, the video coder may gather motion statistics over a longer period of time, say 10 seconds, to decide how to partition the reference picture cache.

In an embodiment, having partitioned the reference picture cache into long term buffer areas and short term buffer areas respectively, a video coder may perform searches for prediction references throughout the reference picture cache and code the input frame(s) according to the search results.

Figure 4:
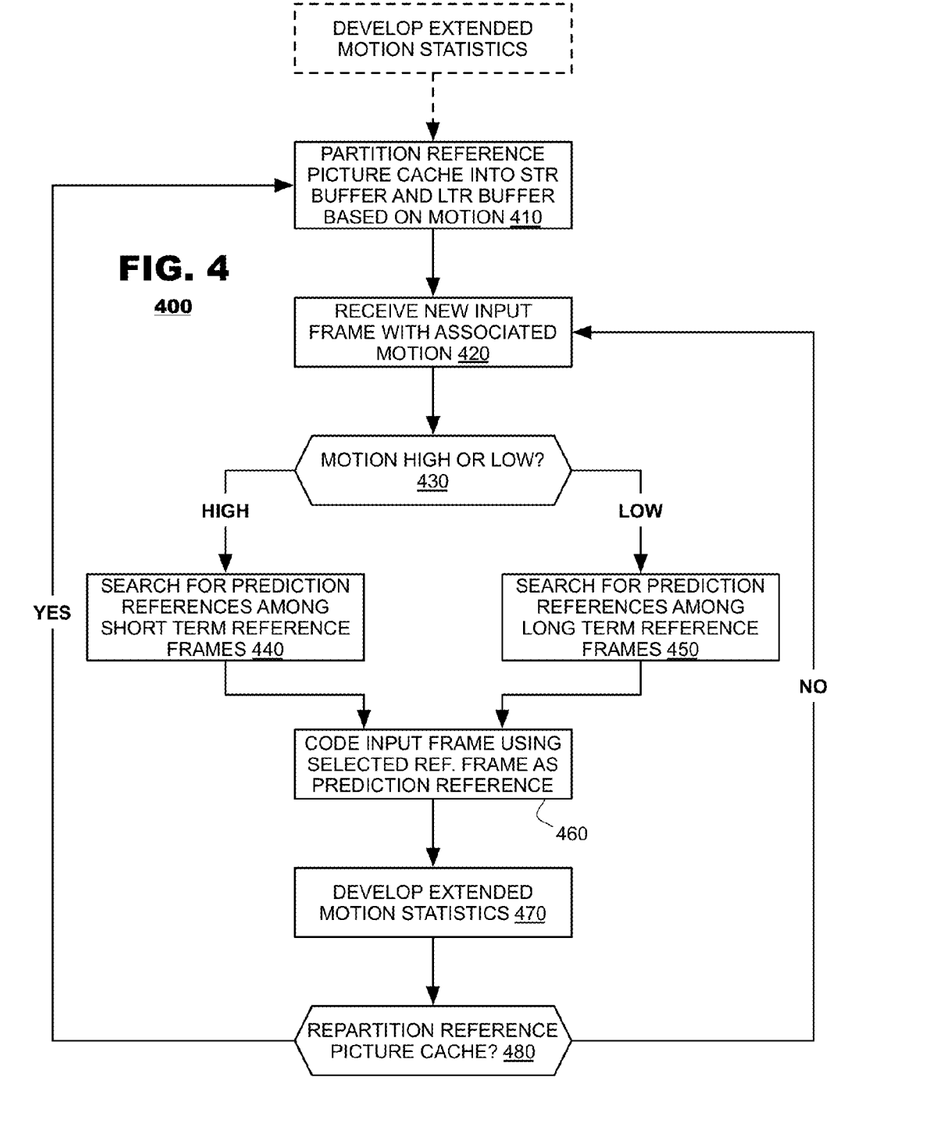
FIG. 4 illustrates a method of partitioning a reference picture cache and coding input video data according to an embodiment of the present invention

FIG. 4 illustrates a method 400 of partitioning a reference picture cache and coding input video data according to an embodiment of the present invention. The method may be performed continuously for as long as a video coder is engaged in coding video data. The method may begin by developing extended motion statistics from which to select a partitioning scheme (shown in phantom) and then by partitioning the reference cache into a short term buffer and a long term buffer based on the extended motion (box 410). Thereafter, the method may receive a new input frame to be coded (box 420). The input frame also may have motion data associated with it indicating motion of the camera at the time the input frame was captured. Based on the frame's motion data, the method optionally may classify the motion as being either "high" or "low" (box 430). If the frame's motion is assessed as a high level of motion, the method may search for prediction reference(s) for the frame from within the short term buffer area (box 440). If the frame's motion is assessed as a low level of motion, the method 400 may search for prediction reference(s) for the frame from within the long term buffer area (box 450). Having selected prediction reference(s) for the frame from among the selected buffer area, the method 400 may cause the input frame to be coded using the selected reference frame(s) as prediction references (box 460). Coded data representing the input frame may be transmitted to a decoder via the channel.

The method 400 also may supplement its extended motion statistics using the motion of the input frame (box 470) and may determine whether the reference picture cache should be re-partitioned (box 480). If not, then the method 400 may return to box 420 and repeat operation using another input frame. If the reference picture cache should be repartitioned, the method may return to box 410 and reparation the reference picture cache by redefining its short term buffer area and long term buffer area.

In another embodiment of the present invention, the method may perform different types of searches in the long term buffer area than in the short term buffer area. For example, when motion data indicates a camera was still during image capture, the system can select reference frames from the long term buffer area simply based on calculations of differences between frames (without motion). When motion data indicates a camera was moving during image capture, the method may perform a motion-based search. Computation of frame differences tends to be less computationally intensive than a motion-based search.

Figure 5:
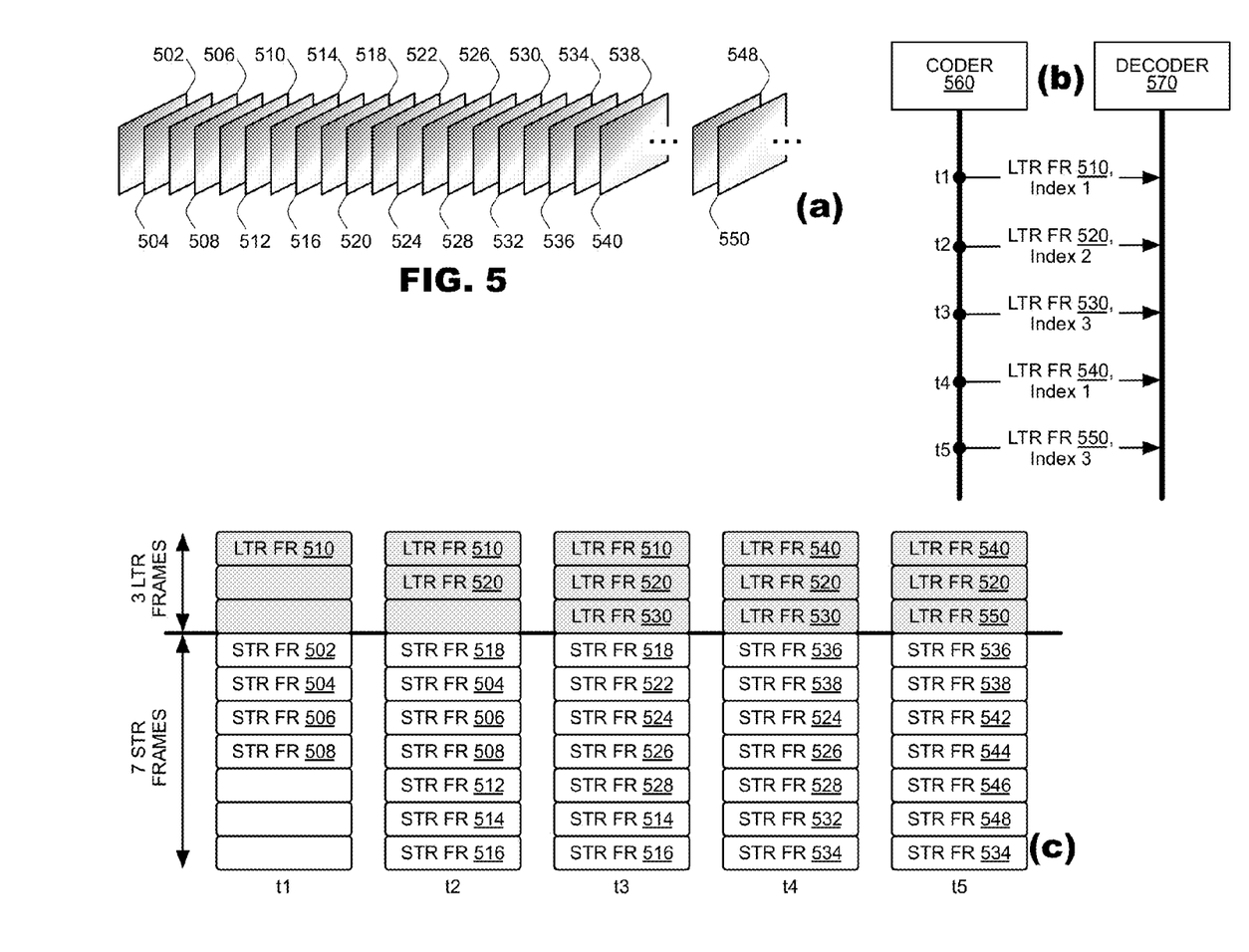
FIG. 5 illustrates operation of the method of FIG. 4 in an exemplary use case.

FIG. 5 illustrates exemplary operation of the method of FIG. 4 in one use case. FIG. 5(a) illustrates reference frames 502-550 from an exemplary video sequence. In this example, assume that frames 510, 520, 530, 540 and 550 are assigned as long term reference frames ("LTRs") and the remaining reference frames are assigned as short term reference frames ("STR"). Although every fifth reference frame is assigned as an LTR, this distribution is merely a technique to help illustrate operative principles of the present invention. In practice, LTR assignments may be made irregularly throughout a video sequence. FIG. 5(a) illustrates reference frames only; in practice, the video sequence may include additional frames which may be coded predictively and transmitted via the channel but do not serve as prediction references for other frames. These non-reference frames are not illustrated in FIG. 5(a) for ease of discussion.

FIG. 5(b) represents communication of LTR data between a transmitting terminal 560 and a receiving terminal 570. When coded data of each LTR frame 510-550 is transmitted, the transmission includes an index identifier representing a location within the reference picture cache where the decoded LTR frame is to be stored.

FIG. 5(c) illustrates the state of an exemplary reference picture cache at various times t1-t5 throughout coding the video sequence of FIG. 5(a). For ease of discussion, the reference picture cache is shown as having capacity for storage of ten (10) frames and having been partitioned into an LTR buffer area of three frames and an STR buffer area of seven frames. The times t1-t5 coincide with transmission of the LTR frames as illustrated in FIG. 5(b). FIG. 5(c) assumes that the reference picture cache is empty prior to coding of frame 502.

By time t1, a video coder 560 has coded and transmitted reference frames 502-510.

Frame 510 is an LTR frame assigned to index position 1. Assuming no transmission errors, the coder 560 and decoder 570 each may store the LTR frame 510 in the LTR buffer area and the STR frames 502-508 in the STR buffer area.

By time t2, the video coder 560 has coded and transmitted reference frames 502-520. Frame 520 is an LTR frame assigned to index position 2. Assuming no transmission errors, the coder 560 and decoder 570 each may store the LTR frames 510, 520 in the LTR buffer area and the STR frames 504-508 and 514-518 in the STR buffer area. Due to limited capacity in the STR buffer area, reference frame 502 may have been evicted to make room for frame 518.

By time t3, the video coder 560 has coded and transmitted reference frames 502-530. Frame 530 is an LTR frame assigned to index position 3. Assuming no transmission errors, the coder 560 and decoder 570 each may store the LTR frames 510, 520, 530 in the LTR buffer area and the STR frames 514-518 and 522-528 in the STR buffer area. Due to limited capacity in the STR buffer area, reference frames 504-512 may have been evicted to make room for frames 522-528.

By time t4, the video coder 560 has coded and transmitted reference frames 502-540. Frame 540 is an LTR frame assigned to index position 1. Assuming no transmission errors, the coder 560 and decoder 570 each may store the LTR frames 520, 530 and 540 in the LTR buffer area. Frame 540 may be stored in position 1 in the LTR buffer area, evicting LTR frame 510. The reference picture cache also may store STR frames 524-528 and 532-538 in the STR buffer area. Due to limited capacity in the STR buffer area, reference frames 514-522 may have been evicted to make room for frames 532-538.

By time t5, the video coder 560 has coded and transmitted reference frames 502-550. Frame 550 is an LTR frame assigned to index position 3. Assuming no transmission errors, the coder 560 and decoder 570 each may store the LTR frames 520, 540 and 550 in the LTR buffer area. Frame 550 may be stored in position 3 in the LTR buffer area, evicting LTR frame 530. The reference picture cache also may store STR frames 534-538 and 542-548 in the STR buffer area. Due to limited capacity in the STR buffer area, reference frames 524-532 may have been evicted to make room for frames 542-548.

The process illustrated in FIG. 5 may continue until the video sequence is consumed or some other stop condition interrupts operation.

An coder may identify the relative sizes of the long term buffer area and short term buffer area using express signaling in the coded bit stream or via implied signaling. Express signaling may involve use of a predetermined field in the protocol where the coder specifies the size of one of the buffer areas, say the long term buffer area. The decoder may calculate the size of the second buffer area (the short term buffer area) as a difference between the maximum size of the reference picture cache and the specified size of the long term buffer area.

The coder also may signal the size of each buffer impliedly, through allocation of LTR indices. Under this scheme, a decoder is free to use any entry within the reference picture cache for storage of an STR frame until it receives LTR frames. Thereafter, the decoder must maintain storage of LTR frames for all indices that are in use until they are released. When a coder allocates new LTR indices and assuming the reference picture cache is filled to capacity, the decoder may evict a short term reference frame to make room for the new LTR frame. The eviction may occur according to a protocol known to the coder; typically, eviction targets the oldest STR frame stored by the reference picture cache.

Figure 6:
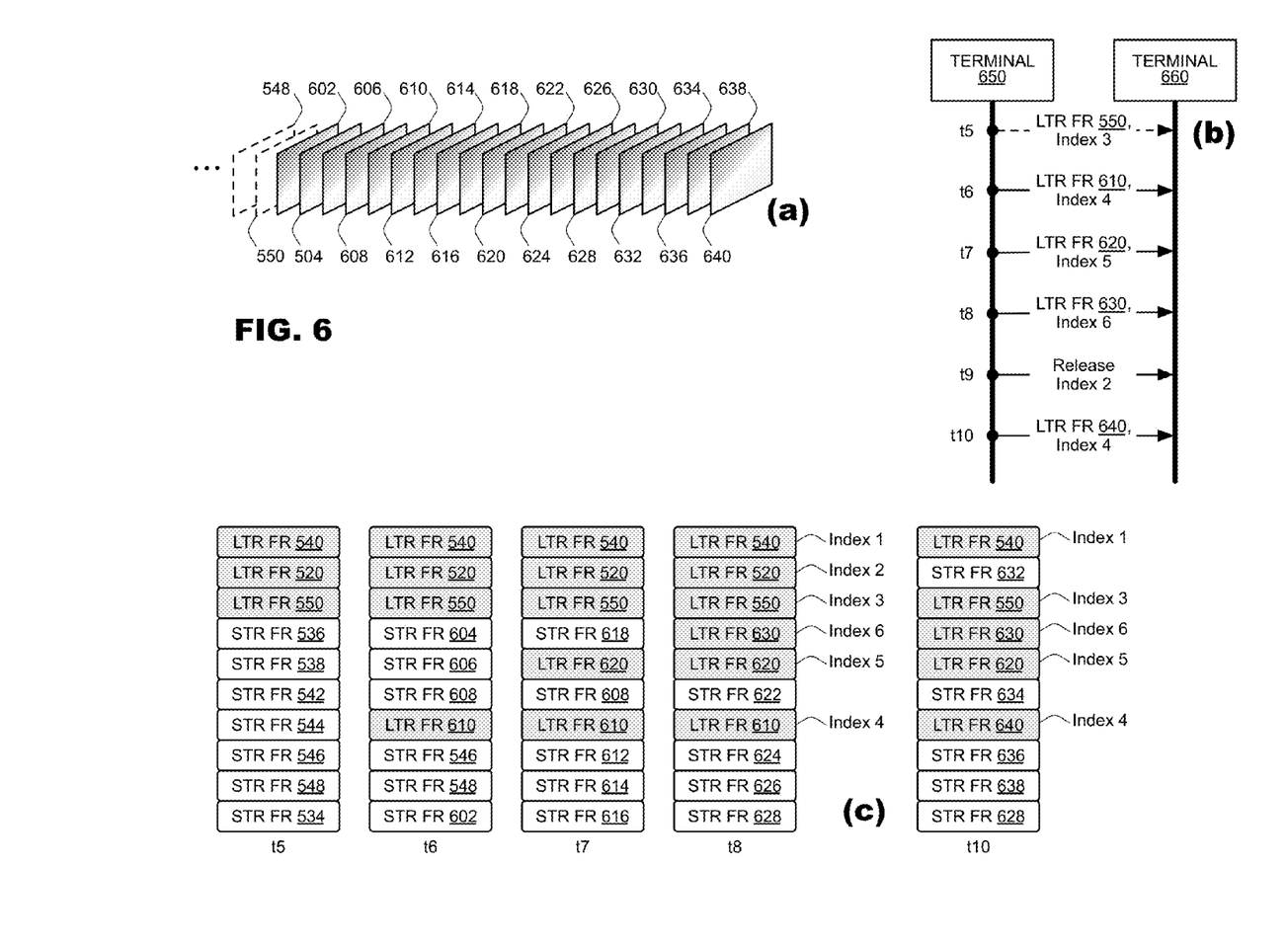
FIG. 6 illustrates an example of cache re-partitioning according to an embodiment of the present invention.

FIG. 6 illustrates an example of re-partitioning continuing from the coding example of FIG. 5. FIG. 6(*a*) illustrates another part of the exemplary video sequence of FIG. 5(*a*) in which frames 602-640 follow frame 550 of FIG. 5(*a*). FIG. 6(*b*) illustrates a communication of LTR data in this example. LTR frames 610-630 are transmitted at times t6-t8 respectively, followed by a release command, identifying index 2. For purposes of discussion, assume that the release command is transmitted immediately following transmission of LTR frame 630, before transmission of STR frame 632. Another LTR frame 640 may be transmitted at time t10.

FIG. 6(*c*) illustrates state of the reference picture cache at times t6-t8 and t10. At time t6, the video coder has coded and transmitted reference frames 602-610. STR frames 602-608 may evict previously cached STR frames 534-542. Frame 610 is an LTR frame assigned to a new index position, no. 4. In response, the reference picture cache may evict a then-oldest STR frame stored in the cache (frame 544) and store the new LTR frame in its place. The reference picture cache may map cache entries to LTR indices on a dynamic mapping basis.

At time t7, the video coder has coded and transmitted reference frames 602-620. STR frames 612-618 may evict previously cached STR frames 546-548 and 602-604. Frame 620 is an LTR frame assigned to another new index position, no. 5. In response, the reference picture cache may evict the then-oldest STR frame stored in the cache (frame 606) and store the new LTR frame in its place.

At time t8, the video coder has coded and transmitted reference frames 602-630. STR frames 622-628 may evict previously cached STR frames 608 and 612-616. Frame 630 is an LTR frame assigned to another new index position, no. 6. In response, the reference picture cache may evict the then-oldest STR frame stored in the cache (frame 618) and store the new LTR frame in its place. FIG. 5(*c*) illustrates entries of the reference picture cache and their relationships to the LTR indices at time t8.

In this example, the coder may transmit a release command to the decoder at time t9, which precedes transmission of STR frame 632. In response, the reference cache may cease to protect the LTR frame 520 from eviction.

At time t10, the video coder has coded and transmitted reference frames 602-640. STR frame 632 may evict LTR frame 520 (former location 2), as frame 520 is the oldest non-protected frame in the cache. STR frames 634-638 may evict previously cached STR frames 622-626. Frame 640 is an LTR frame assigned to index position 4, which replaces LTR frame 610.

The operations described above do not require express signaling to expand the long term buffer area of the reference picture cache. The reference picture cache may expand the long term buffer area on its own accord as it detects new assignments of LTR index numbers. The reference picture cache may allocate for STR frames any cache entries that are not assigned to LTR frames. In the implied signaling embodiment, for example, an unused cache entry such as the one shown in FIG. 5(*c*) at time t2 might be used for storage of an STR frame until it is occupied by an LTR frame. A release command may be used to reduce the size of the long term buffer area and reallocate certain indices for storage of STR frames.

Although the foregoing example illustrates a release command issued immediately after a new LTR index number is assigned, this is unlikely to occur in practice. Allocation of a new LTR index number indicates an expansion of the LTR buffer area, which likely will occur if motion statistics detect a decrease in motion. The release of an LTR index number indicates a contraction of the LTR buffer area, which likely will occur if motion statistics indicate an increase in motion. Therefore, these two events are unlikely to follow each other immediately. This example has been provided merely to indicate the effect of expansion and contraction of the long term and short term buffer areas.

The foregoing discussion has described operation of the embodiments of the present invention in the context of coders and decoders. Commonly, video coders are provided as electronic devices. They can be embodied in integrated circuits, such as application specific integrated circuits, field programmable gate arrays and/or digital signal processors. Alternatively, they can be embodied in computer programs that execute on personal computers, notebook computers or computer servers. Similarly, decoders can be embodied in integrated circuits, such as application specific integrated circuits, field programmable gate arrays and/or digital signal processors, or they can be embodied in computer programs that execute on personal computers, notebook computers or computer servers. Decoders commonly are packaged in consumer electronics devices, such as gaming systems, DVD players, portable media players and the like and they also can be packaged in consumer software applications such as video games, browser-based media players and the like.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A terminal device, comprising:
 a video coder to code input video data according to motion compensated prediction techniques, the video coder including a reference picture cache for storage of reference frames for use in motion compensation, the reference picture cache having a fixed capacity that has been partitioned into a first buffer area designated for storage of long term reference frames and a second buffer area designated for storage of short term reference frames,
 a motion estimator to calculate motion statistics for the input video data, the motion statistics used to partition the reference picture cache into the first and second buffer areas;
 a coding engine to search among the reference picture cache to find a prediction reference for a new input frame, wherein the coding engine confines its search to one of the first and second buffer areas based on an amount of motion associated with the new input frame wherein the coding engine searches the first buffer area when the motion associated with the new input frame is below a predetermined motion threshold and the coding engine searches the second buffer area when the motion associated with the new input frame is above the predetermined motion threshold,
 wherein relative sizes of the designated buffer areas are adjusted dynamically based on an amount of motion present in the video data.

2. The terminal device of claim 1, further comprising a motion sensor coupled to the video coder providing data representing the motion present in the video data.

3. The terminal device of claim 1, further comprising a camera to provide the input video data to the video coder.

4. The terminal device of claim 1, wherein the size of the first buffer area is greater than the size of the second buffer area when the motion present in the video data is below a predetermined threshold indicating low motion.

5. The terminal device of claim 1, wherein the size of the first buffer area is lower than the size of the second buffer area when the motion present in the video data is above a predetermined threshold indicating high motion.

6. The terminal device of claim 1, wherein the motion statistics are calculated from a plurality of frames input to the video coder over a predetermined length of time.

7. The terminal device of claim 6, wherein the predetermined length of time is a multiple of a frame rate of the video coder.

8. A memory management method for a video coder, comprising:
 estimating motion statistics of an input video sequence over a predetermined period of time,
 partitioning a fixed capacity reference picture cache into first and second designated buffer areas based on the estimated motion statistics, the first designated buffer area for storage of long term reference frames and the second designated buffer area for storage of short term reference frames, and
 coding an input frame with reference to a reference frame stored in the reference picture cache, wherein a search for the reference frame is confined to one of the first and second buffer areas based on an amount of motion associated with the new input frame, wherein the search is confined to the first buffer area when motion associated with the new input frame is below a predetermined motion threshold and the search is confined to the second buffer area when motion associated with the new input frame is above the predetermined motion threshold.

9. The method of claim 8, wherein the size of the first buffer area is greater than the size of the second buffer area when there is low motion present in the video data.

10. The method of claim 8, wherein the size of the first buffer area is lower than the size of the second buffer area when there is high motion present in the video data.

11. The method of claim 8, wherein the search is confined to the first buffer area when there is low motion associated with the new input frame.

12. The method of claim 8, wherein the search is confined to the second buffer area when there is high motion associated with the new input frame.

13. The method of claim 8, wherein the estimated motion is derived from data from a motion sensor associated with a camera that captures the input video sequence.

14. The method of claim 8, wherein the estimated motion is derived from content of the input video sequence.

15. The method of claim 8, wherein the estimating and partitioning is repeated over a duration of the input video sequence.

16. The method of claim 8, wherein the long term reference frames are identified by respective index numbers.

17. A video coding method, comprising:
 estimating motion statistics for an input video sequence over a plurality of input frames,
 partitioning a fixed capacity reference picture cache into a first designated buffer area for storage of long term reference frames and a second designated buffer area for storage of short term reference frames, wherein relative sizes of the first and second buffer areas are based on the estimated motion statistics,
 coding an input frame according to motion compensated prediction techniques, the coding including searching for a reference picture from the fixed capacity reference picture cache as a prediction reference,
wherein the searching is confined to one of the designated buffer areas based on an amount of motion associated with the input frame and a predetermined motion threshold.

18. The method of claim 17, wherein the size of the first buffer area is greater than the size of the second buffer area when the estimated motion is in a low range.

19. The method of claim 17, wherein the size of the first buffer area is lower than the size of the second buffer area when the estimated motion is in a high range.

20. The method of claim 17, wherein the estimated motion is derived from data from a motion sensor associated with a camera that captures the input video sequence.

21. The method of claim 17, wherein the estimated motion is derived from content of the input video sequence.

22. The method of claim 17, wherein the long term reference frames are identified by respective index numbers.

* * * * *